United States Patent
Biegert et al.

(10) Patent No.: US 8,249,452 B2
(45) Date of Patent: Aug. 21, 2012

(54) ONT-BASED MICRONODE MANAGEMENT

(75) Inventors: Mark R. Biegert, Maple Grove, MN (US); Steven P. Buska, Chanhassen, MN (US)

(73) Assignee: Calix, Inc., Petaluma, CA (US)

( * ) Notice: Subject to any disclaimer, the term of this patent is extended or adjusted under 35 U.S.C. 154(b) by 680 days.

(21) Appl. No.: 12/407,492

(22) Filed: Mar. 19, 2009

(65) Prior Publication Data

US 2010/0239251 A1    Sep. 23, 2010

(51) Int. Cl.
*H04B 10/20* (2006.01)
(52) U.S. Cl. ........................................................ 398/58
(58) Field of Classification Search ............... 398/67, 398/58, 69
See application file for complete search history.

(56) References Cited

U.S. PATENT DOCUMENTS

| | | | |
|---|---|---|---|
| 6,023,467 A * | 2/2000 | Abdelhamid et al. ...... | 370/236.2 |
| 6,839,872 B2 | 1/2005 | Kohda | |
| 7,085,281 B2 | 8/2006 | Thomas et al. | |
| 7,355,982 B2 | 4/2008 | Abe | |
| 2005/0030898 A1 | 2/2005 | Furlong et al. | |
| 2006/0192434 A1 | 8/2006 | Vrla et al. | |
| 2007/0010132 A1 | 1/2007 | Nelson et al. | |
| 2007/0195823 A1 | 8/2007 | Biegert | |
| 2008/0303679 A1 | 12/2008 | Vrla et al. | |
| 2009/0010643 A1 * | 1/2009 | DeLew et al. ................... | 398/17 |
| 2009/0060530 A1 | 3/2009 | Biegert et al. | |
| 2009/0060531 A1 | 3/2009 | Biegert et al. | |
| 2011/0033189 A1 * | 2/2011 | Biegert et al. ................. | 398/115 |

OTHER PUBLICATIONS

RC511/512/513/514-FE Media Converter, Datasheet, Raisecom Technology Co., Ltd., 2 pages, 2006, available at: http://www.naraisecom.com/p/DatasheetPics/RC51X/RC511_512_513_514-FE%20datasheet.pdf.
Ethernet over Fiber Copper to Fiber Media Converter with Remote Management, Beijing Raisecom Science & Technology Co., Ltd., 3 pages, retrieved from the Internet on Feb. 18, 2009, available at: http://www.davantel.com/user/image/rc51x-fe.pdf.
White Paper: Leveraging RFoG to Deliver DOCSIS® and GPON Services over Fiber, Motorola, Inc., 9 pages, Sep. 2008, available at: http://www.motorola.com/staticfiles/Business/_Documents/static%20files/Leveraging%20RFoG%20to%20Deliver%20DOCSIS%20and%20GPON%20Services%20over%20Fiber.pdf.

* cited by examiner

*Primary Examiner* — Yuanda Zhang
*Assistant Examiner* — Tuan Nguyen
(74) *Attorney, Agent, or Firm* — Shumaker & Sieffert, P.A.

(57) ABSTRACT

This disclosure describes ONT-based management of micronodes in an RFOG network. A micronode is configured to permit remote management via an ONT in an optical network. An optical networking protocol, such as a PON protocol, may be used to exchange information with an ONT for management of the micronode. Management may include configuration and monitoring of the micronode. The micronode may have a management interface that supports remote configuration and monitoring via an ONT coupled to the management interface. An operator may use the ONT as a management terminal for the micronode. The ONT may permit an operator to effectively manage micronodes, and also may offer a ready upgrade path to provide optical networking services such as PON services to a subscriber when the operator is ready to upgrade its CO equipment and CPE.

26 Claims, 8 Drawing Sheets

ONT-BASED MICRONODE MANAGEMENT

TECHNICAL FIELD

This disclosure relates to radio frequency over glass (RFOG) systems, and more particularly, techniques for management of micronodes in an RFOG system.

BACKGROUND

Copper-based transmission systems have long been used for the delivery of voice, video and data services to subscribers. For example, multi-service operators (MSOs) may provide video, data, and voice services utilizing copper coaxial cables and/or twisted pairs. However, MSOs are now more likely to deploy optical fiber to the premises (FTTP) or fiber to the home (FTTH) systems to support video, data and voice services. Although it is desirable to upgrade to optical fiber, some MSOs may choose to not immediately upgrade central office (CO) equipment and customer premises equipment (CPE) designed for radio frequency (RF) communication over cable. Instead, an MSO may provide a micronode that operates as a media converter to convert downstream light signals to RF signals and convert upstream RF signals to light signals. The resulting system may be referred to as an RFOG network. A micronode may be viewed as a transition technology that allows an MSO to upgrade its outside plant from copper to fiber optics without upgrading CO equipment and CPE.

For example, the CO equipment may provide a cable video headend that provides video to subscribers. Although optical fiber is utilized to transmit the video, the video headend may still operate according to the data over cable service interface specification (DOCSIS). DOCSIS defines the communication and operation support interface requirements for a data over cable system. DOCSIS also permits the addition of high speed transmission of data and voice over the coaxial cable. For example, the CO equipment may include a cable modem termination system (CMTS) to support communication with cable modems within subscriber premises. In this manner, the MSO may provide data and voice services to subscribers via the CMTS of the CO equipment. A micronode may allow an MSO to upgrade its outside plant from copper to optical fiber without forcing the MSO to upgrade its CO equipment and CPE.

SUMMARY

In general, this disclosure provides techniques for facilitating management of micronodes in an RFOG network. In accordance with this disclosure, a micronode is configured to permit remote management via an optical network terminal (ONT) in an optical network, such as a passive optical network (PON). In particular, an optical networking protocol may be used to exchange information with an ONT for management of the micronode. The ONT interfaces with the micronode to permit micronode management. Management may include, for example, configuration and/or monitoring of the micronode. The micronode may be equipped with a management interface that supports remote configuration and monitoring via an ONT coupled to the management interface.

An operator such as an MSO may use the ONT as a management terminal for configuration and/or monitoring of the micronode. In this manner, the ONT operates as an intermediary, providing a management communication channel between the CO equipment and the micronode. The ONT may communicate with the CO equipment according to an optical network protocol, such as a PON protocol, and communicate with the micronode using any of a variety of interfaces. Using the ONT-supported management channel, an operator may evaluate the operational status of the micronode, selectively enable and disable services delivered via the micronode, and/or upgrade software or firmware within the micronode. For example, CO equipment may include a management controller and optical line terminal (OLT) for communication with the ONT according to the optical network protocol, e.g., PON protocol.

The ONT may be housed separately from the micronode, and communicate with the micronode via a management interface provided between the ONT and the micronode. In other cases, the ONT and micronode may be housed together within a common housing, and communicate via a management interface within the housing. The ONT and micronode may both be coupled to the same optical fiber, which may extend from the CO equipment to the subscriber premises. The ONT may permit an operator to effectively manage micronodes, and also may offer a ready upgrade path to provide optical network services, such as PON services, to a subscriber when the operator is ready to upgrade its CO equipment and CPE.

In one aspect, the disclosure provides a system comprising an RFOG micronode that converts a first downstream optical signal to a downstream RF electrical signal, and converts an upstream RF electrical signal to an upstream optical signal, and an ONT that receives a second downstream optical signal, and transmits a command to the micronode based on the second downstream optical signal.

In another aspect, the disclosure provides a micronode for use in an RFOG system, the micronode comprising an optical receiver that converts a first downstream optical signal to a downstream RF electrical signal, an optical transmitter that converts an upstream RF electrical signal to an upstream optical signal, and an interface that receives commands from an ONT that received a second downstream optical signal.

In an additional aspect, the disclosure provides a method comprising, in an RFOG micronode, converting a first downstream optical signal to a downstream RF electrical signal, and converting an upstream RF electrical signal to an upstream optical signal, and, in an ONT, receiving a second downstream optical signal, and transmitting a command to the micronode based on the second downstream optical signal.

The details of one or more aspects of the disclosure are set forth in the accompanying drawings and the description below. Other features, objects, and advantages will be apparent from the description and drawings, and from the claims.

DETAILED DESCRIPTION

Figure 1:
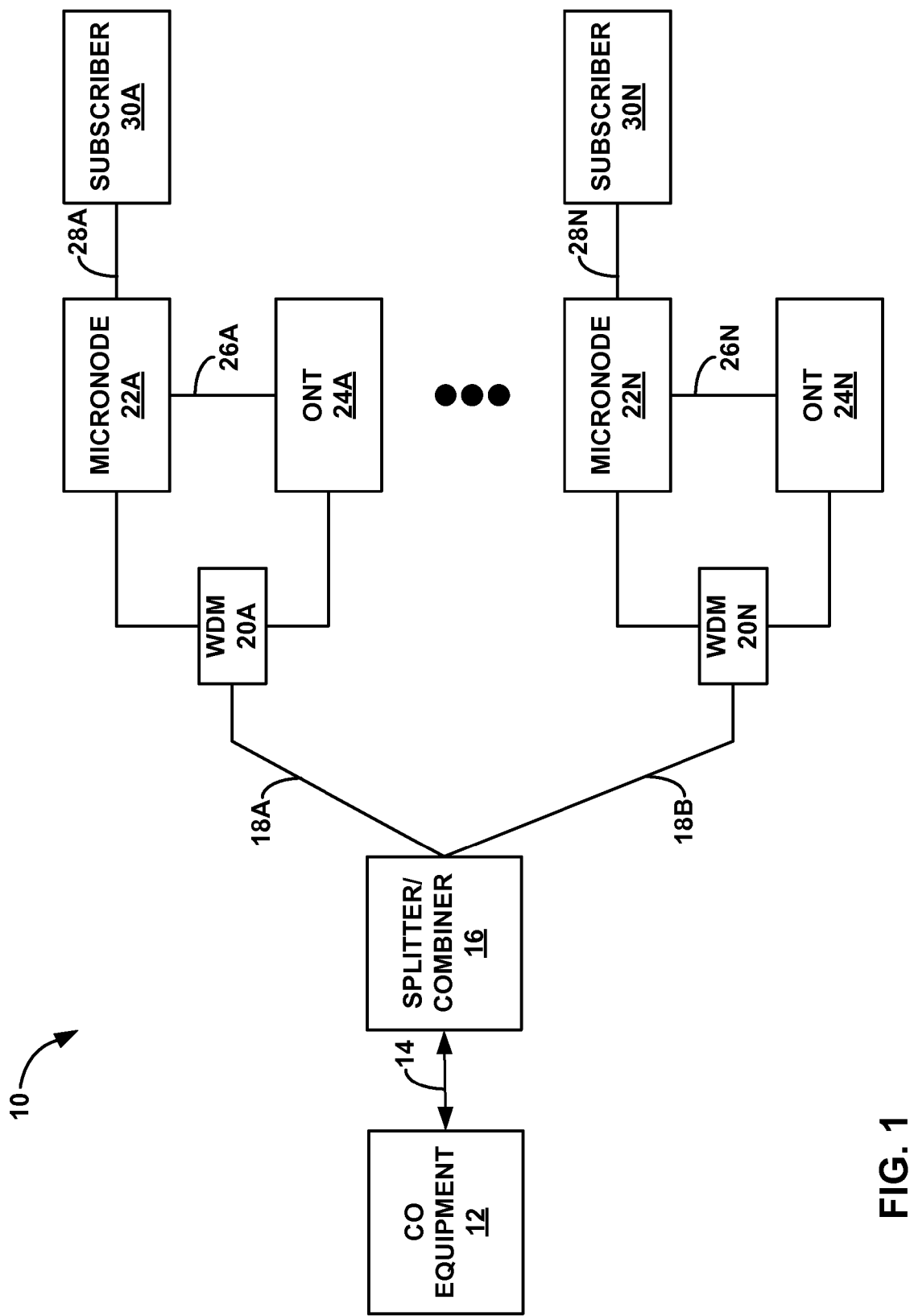
FIG. 1 is a block diagram illustrating an RFOG system with ONT-managed micronodes.

This disclosure provides techniques for facilitating management of micronodes in an RFOG network. A micronode is configured to permit remote management via an ONT. The ONT may be configured to operate according to an optical networking protocol, such as a PON protocol. An ONT is sometimes alternatively referred to as an optical network unit (ONU). The optical networking protocol, e.g., PON protocol, is used to exchange information between an OLT and an ONT for management of the micronode. Management may include, for example, configuration and/or monitoring of the micronode. The micronode may be equipped with a management interface that supports remote configuration and monitoring via an ONT coupled to the management interface. The ONT and micronode may include reciprocal management interfaces, which may be interconnected via cabling, wiring, or direct connections.

An operator such as an MSO may provide, at a CO or elsewhere in a network, an OLT and a management controller. The management controller may control the OLT to communicate with the ONT via an optical networking protocol, such as a PON protocol, to support configuration and monitoring of the micronode. In this manner, the ONT may operate as an intermediate management terminal for access to the micronode. In particular, the ONT may provide an optical networking protocol-based management communication channel between the CO equipment and the micronode. The ONT may communicate with the micronode using any of a wide variety of interfaces, such as universal serial bus (USB), inter-integrated circuit ($I^2C$), or a simple serial channel, e.g., based on recommended standard 232 (RS232), or a custom interface that takes advantage of the programmable and flexible nature of FPGA or other components in an ONT and/or micronode. Using the ONT-supported management channel, an operator may evaluate operational status of the micronode, selectively enable and disable services delivered via the micronode, and/or upgrade software or firmware within the micronode.

The ONT may be located with the micronode at the subscriber premises, which may be a residential or business location. The ONT may be housed separately from the micronode, or integrated within a common housing with the micronode. In each case, the ONT may communicate with the micronode via the management interface provided between the ONT and the micronode. The ONT and micronode may both be coupled to the same optical fiber, e.g., via a wave division multiplexer (WDM). The optical fiber may extend from the CO equipment to the subscriber premises and support multiple upstream and downstream wavelengths.

The ONT may be used as a dedicated management terminal for the micronode, with the micronode providing all services to the subscriber, such as voice, video and data, e.g., according to DOCSIS. Alternatively, the ONT may be configured and installed to provide selected optical networking services, such as PON services, to the subscriber. As one example, the ONT may support gigabit-capable PON (GPON) voice and data services, while the micronode provides DOCSIS-based video services to the subscriber. In either case, the ONT may permit an operator to effectively manage a micronode, and also provide an upgrade path for delivery of full or partial PON services to the subscriber when the operator is ready to upgrade its CO equipment and CPE.

A micronode may communicate voice, data, and/or video information between CPE associated with a subscriber and CO equipment associated with an MSO. In particular, the micronode receives downstream optical signals conveying the voice, data, and/or video service information from the CO, converts the optical signals to downstream RF electrical signals, and transmits the downstream RF electrical signals to the CPE. The micronode also may receive upstream RF electrical signals conveying voice, data and/or video service information from the subscriber, converts the upstream RF electrical signals to upstream optical signals, and transmits the upstream optical signals to the CO. The upstream RF electrical signals may include voice information, data uploads or download requests (e.g., for Internet services), or video services requests, such as video on demand orders.

A system may include a RFOG micronode and an ONT. For multiple subscribers, the system may include multiple micronodes and multiple ONTs. The RFOG micronode may convert a first downstream optical signal to a downstream radio frequency (RF) electrical signal, and convert an upstream RF electrical signal to an upstream optical signal. The ONT may receive a second downstream optical signal. The second downstream optical signal may be transmitted by an OLT, and received and processed by an ONT, according to an optical networking protocol, such as a PON protocol. The ONT may transmit a command to the micronode based on the second downstream optical signal. CO equipment such as a management controller may be configured to include the command in the downstream optical signal. The micronode is configured to permit remote management operations based on commands received by the ONT.

The commands may include configuration commands or status request commands. As an example, a status request command may include a request for at least one of laser status, power supply status, interference status (e.g., RF ingress noise level), received optical power status, transmitted optical power status, and received electrical power status at the micronode. In response to a status request command from the ONT, the micronode may transmit a status reply to the ONT. In some cases, a micronode may voluntarily generate status messages. Status replies in response to status request commands and voluntary status messages will generally be referred to as status messages. The ONT may transmit an upstream optical signal in response to a status message. The upstream optical signal may include the status message from the micronode, or other information based on the status reply or message from the micronode. In this manner, the ONT may communicate the status message to the management controller via the OLT.

A configuration command may include a software and/or firmware update for the micronode, which may be referred to generally as a code update. The micronode may execute the code update in response to the code update configuration command. As another example, a configuration command may include a service enable/disable command to enable or disable delivery of a service by the micronode. In response to the service enable/disable command, the micronode may enable or disable delivery of the services. In some cases, the micronode may turn on all subscriber services in response to an enable command, or turn off all subscriber services in response to a disable command. As on example, the micronode may include a switch to simply switch power to the micronode on or off in response to and enable or disable command, respectively. In this case, the power switch may reside inside or outside of the micronode, and the hardware of the micronode may be otherwise unaltered from a standard form. In other cases, the micronode may turn on and off selected subscriber services in response to an enable/disable command.

In each of the examples above, the configuration command may be generated by a management controller that controls an OLT to transmit a downstream optical signal containing the command for the micronode to the ONT. Likewise, the ONT may generate an upstream optical signal containing a status message from the micronode, and transmit the signal to the OLT for the management controller. Downstream signals sent by the OLT and upstream signals sent by the ONT may be transmitted, received, and processed according to an optical networking protocol, e.g., according to a PON protocol such as the GPON protocol. A wave division multiplexer (WDM) may combine first and second upstream optical signals from the micronode and the ONT, and split first and second downstream optical signals between the micronode and the ONT.

The micronode may transmit the first upstream optical signal at a first wavelength, and the ONT may transmit the second upstream optical signal at a second wavelength. The micronode may receive the first downstream optical signal at a third wavelength, and the ONT may receive the second downstream optical signal at a fourth wavelength. In some examples, the first wavelength is approximately 1610 nanometers (nm), the second wavelength comprises 1310 nm, the third wavelength comprises 1550 nm, and the fourth wavelength comprises 1490 nm.

As discussed above, the ONT may communicate with the OLT over the optical fiber link according to an optical networking protocol. One example of the optical networking protocol is a PON protocol, such as GPON, as defined in the ITU-T G984 standard. However, other optical networking protocols may be used, such as Broadband PON (BPON) as defined in the ITU-T G983 standard, or Ethernet PON (EPON), as defined in the IEEE 802.3ah standard and sometimes alternatively referred to as Gigabit Ethernet PON (GE-PON), and Active Ethernet (AE) optical networks, as also defined in the IEEE 802.3ah standard. Although a variety of optical networking protocols may be used, PON protocols such as GPON will be described in this disclosure for purposes of illustration. The ONT is coupled to the micronode to relay downstream commands from the OLT and management controller to the micronode, and relay upstream messages from the micronode to the OLT and management controller.

In some examples, the ONT provides an optical networking protocol-based communication channel for remote configuration and/or monitoring of the micronode using an optical networking protocol that specifies rules for the transfer of information in an optical network. For example, the optical networking protocol may be a PON protocol, such as GPON, that specifies rules for transfer of information in a GPON system. As another example, the optical networking protocol may be correspond to another standard, such as an Active Ethernet (AE) standard that specifies rules for transfer or information in an AE system. The optical networking protocol, e.g., GPON, BPON, EPON, AE, or the like, is different from any protocol that may be used for DOCSIS via RFOG communication.

A micronode ordinarily operates simply as a pass-through media converter to support DOCSIS services over an RFOG network, and does not provide remote management capabilities. In particular, the micronode ordinarily does not provide a transport channel to support remote management operations over the network. For example, there is no channel for transmission of a command to enable or disable video service, which is one of the most common operations performed by an operator. A service call, known in the industry as a "truck roll," typically is made to visit the micronode on-site and manually enable or disable video service. A truck roll is an expensive, slow and inefficient way to address this issue.

Another management operation involves determining power supply status. It is important to monitor the health of batteries associated with an uninterruptible power supply (UPS) unit that powers the micronode. However, a micronode does not provide a reverse transport channel to convey status information to a CO. Options to determine battery health generally include periodically checking the UPS unit on-site with a truck roll, having a subscriber check the batteries, or replacing batteries when they fail to provide backup power on power failure. Again, a truck roll is inefficient. Forcing a subscriber to check battery health is undesirable due to inconvenience and lack of technical sophistication. Waiting for battery failure is unacceptable for critical customers such as businesses or emergency services.

An additional example of a management operation is the performance of status or health checks on the micronode itself. Common micronode status requests include requests for status relating to determination of laser health, optics health, received optical power levels, transmitted optical power levels, received electrical power levels, or levels of electromagnetic interference sometimes referred to as RF ingress noise. Lasers may require more drive current for proper operation as they age. To ensure reliable operation, checking laser drive current data is a useful part of a maintenance program. Plant diagnostics are important so that a user can properly maintain the health of RF and optical plants. It is desirable to gather information like ingress noise levels, received optical power, transmitted optical power, and received RF power. A micronode is a convenient place to perform plant diagnostics because it interfaces to the RF and optical plants. However, a micronode does not include a transport channel to support remote status requests.

Another management operation is the download of a software or firmware update, which may be referred to as a code update. A micronode may contain processing circuitry such as one or more processors used to perform a variety of controller functions. Occasionally, software or firmware updates are required to fix problems in the micronode or add new features to the micronode. Without a transport channel for remote download of code updates in a micronode, a truck roll is typically needed. Again, a truck roll is inefficient and can significantly increase system management costs.

In accordance with this disclosure, an ONT supports remote management operations for a micronode. Using a micronode management path provided by an ONT, common operations like video service disablement, battery testing and laser testing can be performed remotely for a micronode without the need for a truck roll. As discussed above, for example, the operator can transmit status and/or configuration commands to the micronode via the ONT. In this manner, the operator can remotely update software within the micronode via the ONT without the need for a truck roll. In addition, via the ONT, the operator may remotely disable or enable video service delivered by the micronode without the need for a truck roll. As another example, via the ONT, the operator may be able to remotely determine a variety of micronode status information without a truck roll.

The ONT provides a path for communicating management information between the CO and the micronode that is separate from the upstream and downstream optical channels of the micronode. In this manner, an operator can remotely manage micronodes. Using a PON protocol, such as GPON, the OLT and ONT provide a separate timing mechanism to ensure that lasers on the PON do not collide with one another. Hence, the management path can be a standards-based solution. In addition, the OLT and ONT incorporate appropriate WDM hardware. Additions of an OLT and ONT, and modification of the micronode, may present additional cost. However, higher deployment costs may be desired by some customers to achieve the advantages of remote management of micronodes. Also, deployment of ONTs may provide a ready upgrade path for the operator when it is time to upgrade CO equipment and CPE to support PON services. When the CO equipment and CPE are upgraded, the ONTs are already in place, simplifying the conversion from a cable system to a PON system.

FIG. 1 is a block diagram illustrating an RFOG system 10. As shown in FIG. 1, RFOG system 10 includes CO equipment 12, fiber optic link 14, optical splitter/combiner 16, one or more fiber optic links 18A-18N (collectively referred to as fiber optic links 18), wavelength division multiplexers (WDM) 20A-20N (collectively referred to as WDMs 20), micronodes 22A-22N (collectively referred to as micronodes 22), ONT 24A-24N (collectively referred to as ONTs 24), micronode control channels 26A-26N (collectively referred to as micronode control channels 26), RF channels 28A-28N (collectively referred to as RF channels 28), and subscribers 30A-30N (collectively referred to as subscribers 30)). For purposes of illustration, FIG. 1 shows two WDMs 20, micronodes 22, ONTs 24, RF channels 28, and subscribers 30. However, there may be more or fewer than two WDMs 20, micronodes 22, ONTs 24, RF channels 28, and subscribers 30, depending on network size, design and implementation.

Figure 2:
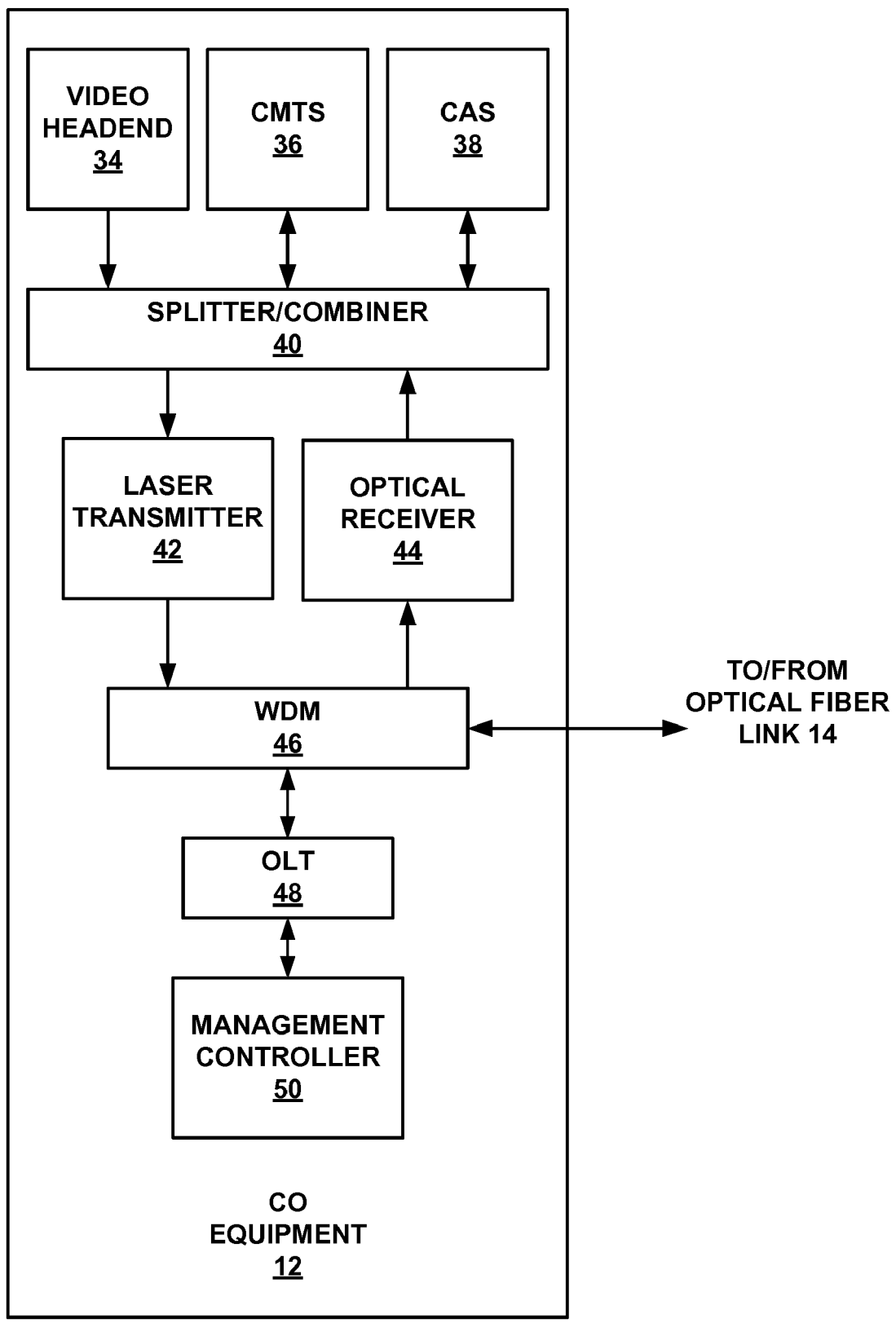
FIG. 2 is a block diagram illustrating example CO equipment for use in an RFOG system.

CO equipment 12 may be operated by a multi-service operator (MSO). CO equipment 12 may provide DOCSIS-compliant hardware to support various services such as video, voice, and data over RFOG system 10 via micronodes 22. In addition, CO equipment 12 may include PON hardware to support communication with ONTs 30. An example of an array of devices associated with CO equipment 12 is shown in FIG. 2. CO equipment 12 may support delivery of voice and data services via a cable modem termination system (CMTS). CO equipment 12 may support delivery of video services from a video headend. CO equipment 12 may include circuitry to convert RF electrical signals carrying voice, data and video information to optical signals for downstream transmission via fiber optic links 14 and 18.

In some examples, the downstream voice, video, and data optical signals may be transmitted at a wavelength of approximately 1550 nanometers (nm). In addition, CO equipment 12 may also transmit management commands as downstream optical signals at approximately 1490 nm wavelength via fiber optic links 14 and 18. In this manner, the downstream optical signals carrying voice, video, and data services to micronodes 22 may be separated from the downstream optical signals carrying management commands to ONTs 24 because the wavelengths for the two are different. The 1550 nm and 1490 nm wavelengths are provided for illustration purposes, and should not be considered limiting. Any suitable wavelength may be utilized, but preferably the wavelength for the downstream optical signals for the voice, video, and data services is different than the wavelength for the downstream optical signals for the commands.

CO equipment 12 may receive upstream optical signals including voice, video and data transmissions from subscribers 30 via micronodes 22, e.g., at 1610 nm via fiber optic link 14. For example, the upstream video transmissions may include optical signals carrying so-called RF return signals for control of video services, such as video on demand or pay per view. CO equipment 12 may also receive upstream optical signals including management messages such as status replies or status messages from micronodes 22 via ONTs 24, e.g., at 1310 nm via fiber optic link 14. Similar to downstream transmission, the upstream optical signals from micronodes 22 may be separated from the upstream optical signals from ONTs 24 because the wavelengths for the two are different. The 1610 nm and 1310 nm wavelengths are provided for illustration purposes only, and should not be considered limiting. Any suitable wavelength may be utilized, but preferably the wavelength for the upstream optical signals for the voice, video and data services is different than the wavelength for the upstream optical signals for the maintenance messages. In general, the wavelengths for the downstream optical signals should be different than the wavelengths for the upstream optical signals.

As shown in FIG. 1, CO equipment 12 transmits downstream optical signals to splitter/combiner 16, and receives upstream optical signals from splitter/combiner 16. Splitter/combiner 16 serves micronodes 22 and ONTs 24. Splitter/combiner 16 may be considered a 1×N splitter/combiner, where N refers to the number of micronodes 22 or ONTs 24. In the example of FIG. 1, N is equal to 2. However, there may be more than two micronodes 22 and ONTs 24, or there may be a single micronode 22 and ONT 24. For downstream transmission, including voice, video, and data and maintenance commands and signals, optical splitter/combiner 16 receives downstream optical signals from CO equipment 12, splits the downstream signals, and distributes them to each one of WDMs 20 via respective optical fiber links 18. For upstream transmission, including voice and data and maintenance commands and signals, optical splitter/combiner 16 receives optical signals from micronodes 22 and ONTs 24 via respective WDMs 20 and optical fiber links 18 and optically combines them for transmission to CO equipment 12.

Different micronodes 22 and ONTs 24 may be configured to transmit upstream optical signals according to grants to subscribers 30 utilizing time division multiple access (TDMA) techniques. CO equipment 12 may grant certain time slots to each one of subscribers 30 to transmit upstream optical signals. In such examples, micronodes 22 and ONTs 24 may transmit optical signals within the same time slot granted to respective subscribers 30 served by the micronodes and ONTs. Alternatively, in some examples, CO equipment 12 may grant certain time slots to each one of subscribers 30 to transmit upstream optical signals and grant separate time slots to each one of ONTs 24 to transmit upstream optical signals. In such examples, micronodes 22 and ONTs 24 may transmit optical signals at different wavelengths during the same time slots or different time slots.

WDMs 20 provide wavelength multiplexing and demultiplexing. One example of WDMs 20 is a coarse wavelength division multiplexer (CWDM). For downstream reception from CO equipment 12, each one of WDMs 20 may receive 1550 nm voice, video, and data information and 1490 nm maintenance commands. WDMs 20 split the 1550 nm and 1490 nm downstream optical signals and provide them to micronodes 22 and ONTs 24, respectively. For example, the voice, video, and data service signals received from CO equipment 12 at 1550 nm is provided to micronodes 22 and the maintenance commands received from CO equipment 12 at 1490 nm are provided to ONTs 24.

For upstream transmission to CO equipment 12, each one of WDMs 20 receives 1610 nm voice, video and data service signals from respective micronodes 22 and 1310 nm maintenance messages from respective ONTs 24. WDMs 20 combine the 1610 nm and 1310 nm upstream optical signals from their respective micronodes 22 and ONTs 24 and provide them to CO equipment 12 via splitter/combiner 16 and optical fiber links 18 and 14. For example, voice, video and data signals transmitted upstream at 1610 nm and maintenance messages transmitted upstream at 1310 nm are combined in WDMs 20 and transmitted to CO equipment 12 via optical splitter/combiner 16.

In FIG. 1, for purpose of illustration, micronodes 22 and ONTs 24 are shown as separate devices installed at subscriber sites for purposes of illustration. In this case, each micronode 22 and ONT 24 may have its own, separate housing, and be coupled by an interconnection such as cabling, wiring or direct connections. However, in some examples, each micronode 22 and its associated ONT 24 may be provided together in a common device housing installed at a subscriber site, and be directly coupled to one another. For purposes of illustration, WDMs 20 are shown outside of respective micronodes 22 and ONTs 24. However, in some examples, WDMs 20 may be provided in a common housing with either a micronode 22 or an ONT 24, or both in the case of a device housing containing both a micronode and an ONT.

Figure 3A:
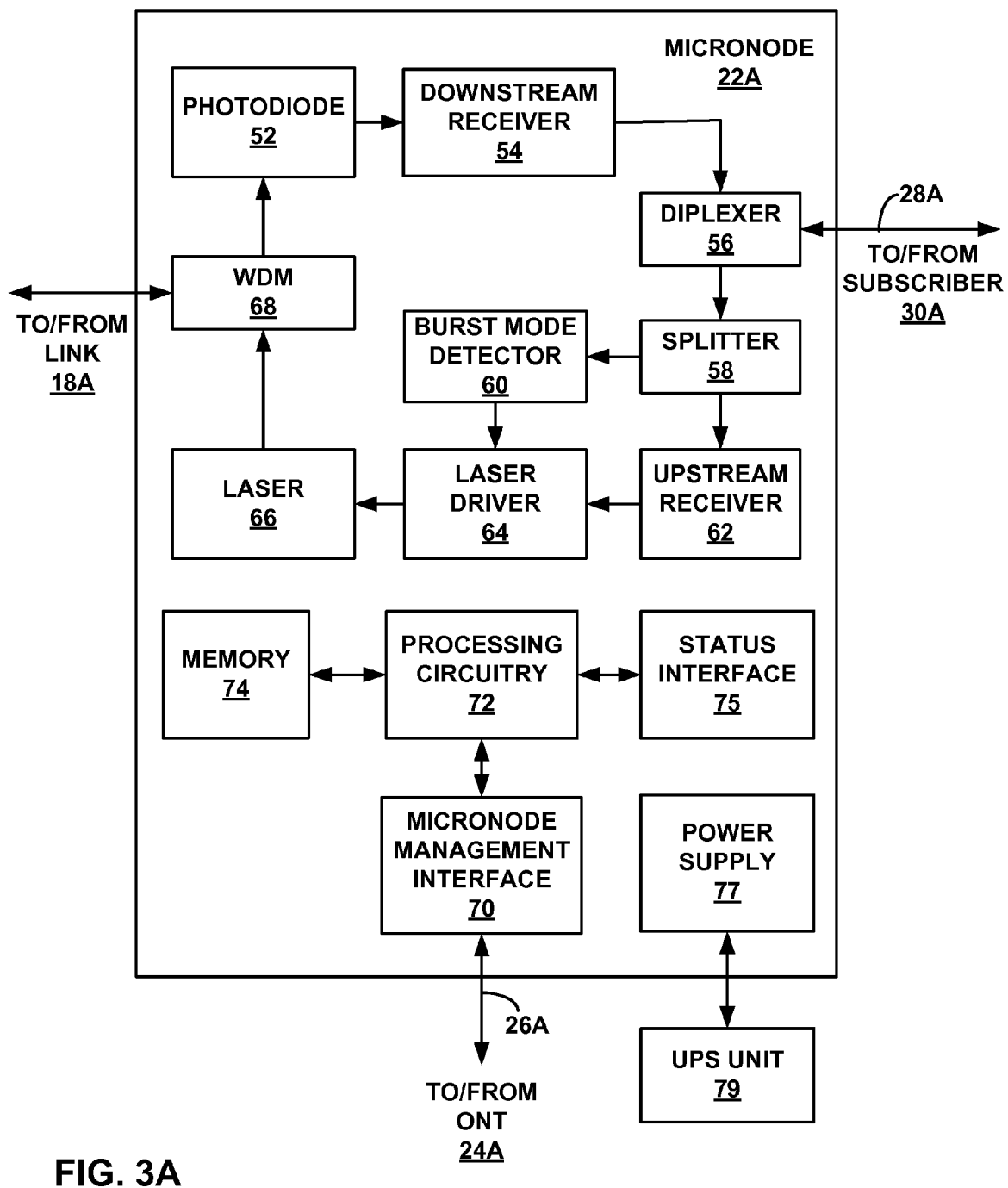
FIG. 3A is a block diagram illustrating an example micronode including a management interface for use in an RFOG system.

As described in more detail with respect to FIG. 3A, each micronode 22 may comprise a WDM that provides the 1550 nm downstream optical signals to a photodiode that converts the optical signal to an RF electrical current signal. The RF electrical current signal is provided to a downstream receiver that converts the RF electrical current to an RF voltage output signal. In some examples, CO equipment 12 may desire to disable or enable service. To disable service, micronodes 22 may disable the downstream receiver. To enable service, micronodes 22 may enable the downstream receiver. Alternatively, to only disable video service, the downstream receiver may be capable of filtering out video information for instances where CO equipment 12 desires to disable only video service. Or, to enable video service, the downstream receiver may not filter out video information. The downstream receiver may also be capable of generating phase alternating line (PAL) or national television system committee (NTSC) compliant video. The voltage output from the downstream receiver is provided to a diplexer coupled to one of RF channels 28. The diplexer provides the downstream voice, video, and data electrical signals to one of subscribers 30 via one of RF channels 28.

The diplexer in each micronode 22 receives upstream electrical signals from one of subscribers 30 via a respective RF channel 28. The diplexer within each micronode 22 is capable of separating downstream and upstream electrical signals. The diplexer provides the upstream electrical signal to an optical splitter. The splitter couples to a burst mode detector and an upstream receiver. The upstream receiver provides the upstream electrical signals to a laser driver that drives a laser to convert the upstream electrical signal to an upstream optical signal with a wavelength of 1610 nm. The burst mode detector receives the upstream electrical signal from the splitter to determine when the laser driver should be enabled and disabled to provide the upstream optical signal in bursts. The burst mode detector provides an enable signal to the laser driver to drive the laser and a disable signal to disable the laser driver after the laser driver has completed delivery of the upstream optical signal.

Figure 3B:
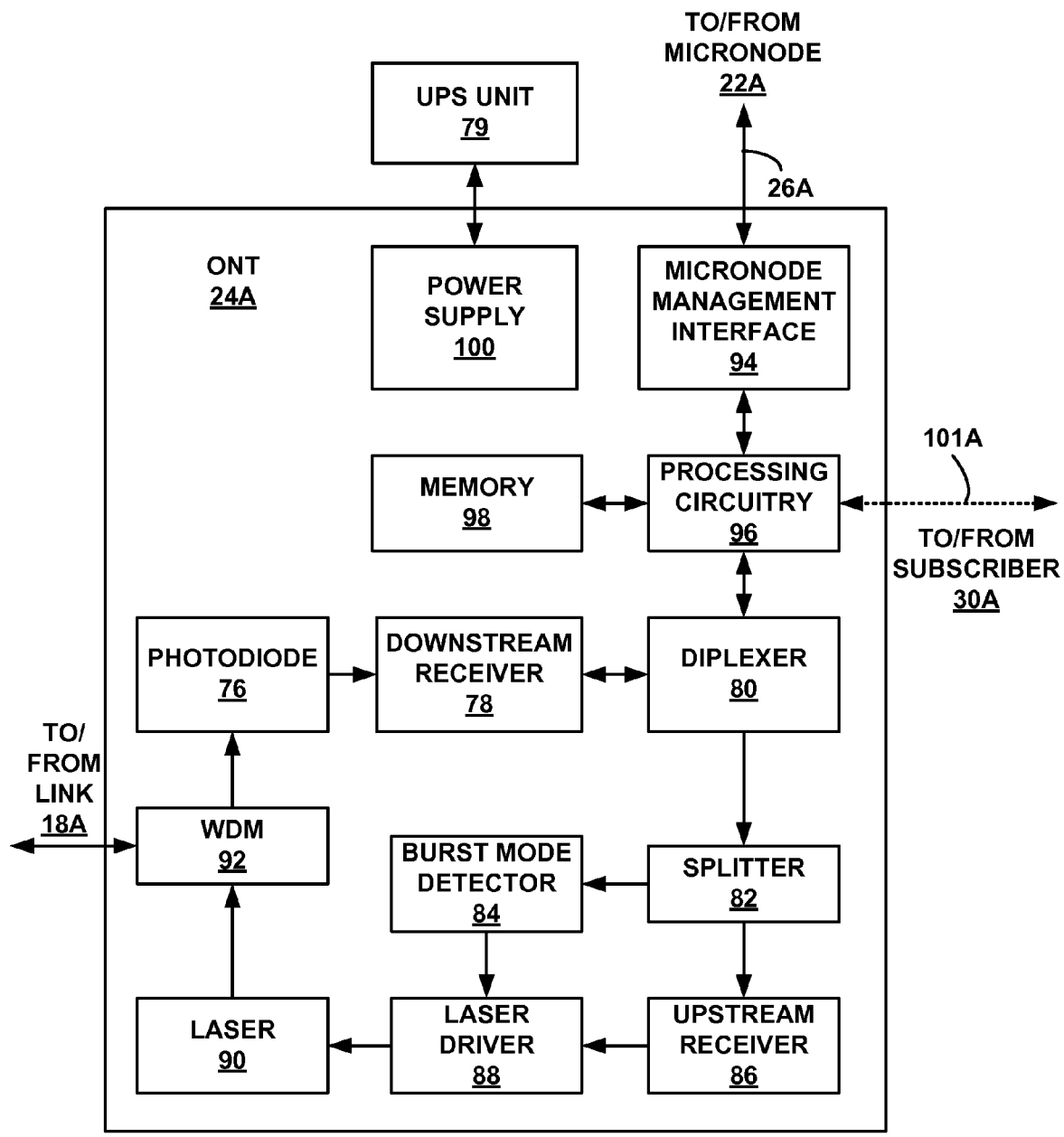
FIG. 3B is a block diagram illustrating an example ONT including a management interface for managing a micronode in an RFOG system.

Each one of ONTs 24 may comprise circuitry similar to micronodes 22, as described in more detail with respect to FIG. 3B. For example, each ONT 24 may comprise a WDM that provides downstream 1490 nm optical signals to a photodiode that converts the optical signal to an electrical current. The electrical current is provided to a downstream receiver that converts the electrical current to a voltage signal. The output of the downstream receiver is coupled to a diplexer that separates downstream and upstream electrical signals. The diplexer is coupled to ONT processing circuitry that communicates with a corresponding micronode 22 via a management interface coupled to a micronode control channel 26. The management interface may support transmission of management commands for micronode enablement/disablement (e.g., for video service denial), code update downloads, micronode status reporting, and power delivery to the micronode if the management interface supports power delivery.

The diplexer receives upstream electrical signals from the ONT processing circuitry. The splitter couples to a burst mode detector and an upstream receiver. The upstream receiver provides the upstream electrical signals to a laser driver that drives a laser to convert the upstream electrical signal to an upstream optical signal with a wavelength of 1310 nm. The burst mode detector receives the upstream electrical signal from the splitter to determine when the laser driver should be enabled and disabled to provide the upstream optical signal in bursts. The burst mode detector provides an enable signal to the laser driver to drive the laser and a disable signal to disable the laser driver after the laser driver has completed delivery of the upstream optical signal.

As described above, an ONT 24 operates as a management terminal to convey management commands and messages between a micronode 22 and CO equipment 12. Accordingly, the diplexer and ONT processing circuitry within ONT 24 provides maintenance commands from CO equipment 12 to micronodes 22 via micronode control channels 26. The lasers within ONTs 24 provide maintenance messages from micronodes 22, via the ONT processing circuitry, to CO equipment 12 fiber optic links 18.

In some examples, micronodes 22 and corresponding ONTs 24 may transmit upstream optical signals during the same time slot granted to the corresponding subscribers 30 to which the micronode is coupled. For example, subscriber 30A may transmit upstream signals to CO equipment 12 during its granted time slot. Subscriber 30A may transmit upstream electrical signals to micronode 22A. Micronode 22A may convert the electrical signals to optical signals and transmit the optical signals within the granted time slot. Micronode 22A may transmit maintenance messages to ONT 24A. ONT 24A may store the maintenance messages and transmit upstream optical signals conveying the maintenance messages to CO equipment 12 during the same time slot that micronode 22A transmits the upstream optical signals. Operations of micronode 22A and ONT 24A will be described for purposes of illustration, with the understanding that other micronodes and ONTs in system 10 may operate in a manner substantially identical or similar to micronode 22A and ONT 24A.

Alternatively, micronode 22A and ONT 24A may not transmit upstream optical signals during the same time slot. CO equipment 12 may grant subscriber 30A a time slot that is different than a time slot that CO equipment 12 may grant to ONT 24A. For example, subscriber 30A may be granted an upstream time slot according to a DOCSIS protocol applied by CO equipment 12. ONT 24A may be granted an upstream time slot according to a GPON protocol applied by CO equipment 12. In such examples, micronode 22A may transmit upstream optical signals during the time slot granted to subscriber 30A, and ONT 24A transmit upstream optical signals during the time slot granted to ONT 24A. Similar timing arrangements may be applied to all respective sets of micronodes 22, ONTs 24 and subscribers 30.

In the example shown in FIG. 1, each micronode 22 is free to communicate voice, video, and data signals between CO equipment 12 and a respective subscriber 30. The maintenance commands are communicated between micronodes 22 and CO equipment 12 via respective ONTs 24, acting as intermediary management terminals. For example, to update software or firmware executed by one or more processors within micronode 22A, CO equipment 12 transmits a downstream optical signal at 1490 nm to ONT 24A according to an optical networking protocol. For example, the optical networking protocol may be a PON protocol such as GPON protocol, or an AE protocol. ONT 24A receives the downstream optical signal that conveys the updated code, converts it to an electrical signal, and provides the electrical signal to micronode 22A via micronode control channel 26A. In response, micronode 22A executes the code update to update its software or firmware. In this manner, CO equipment 12 is free to transmit the downstream voice, video, and data optical signals at 1550 nm to ONT 24A because all downstream maintenance communication is performed at 1490 nm via ONT 24A.

To enable or disable service to subscriber 30A, CO equipment 12 may transmit a downstream optical signal at 1490 nm to ONT 24A according to an optical networking protocol such as a PON protocol (e.g., GPON) or an AE protocol. ONT 24A receives the downstream optical signal and converts it to an electrical signal that conveys whether micronode 22A should enable or disable service. If CO equipment 12 desires to disable service to subscriber 30A, in response to the electrical signal, micronode 22A may disable the downstream receiver coupled to the downstream photodiode. Similarly, if CO equipment 12 desires to enable video service to subscriber 30A, in response to the electrical signal, micronode 22A may enable the downstream receiver coupled to the downstream photodiode.

To query operational status, CO equipment 12 may transmit a downstream optical signal at 1490 nm to ONT 24A according to a PON protocol. ONT 24A receives the downstream optical signal and converts it to an electrical signal that includes a status request command for micronode 22A. ONT 24A transmits the status request command to micronode 22A via micronode control channel 26A. Processing circuitry in micronode 22A may determine the status, e.g., laser bias current, and convey a status reply electrical signal to ONT 24A via micronode control channel 26A. In response, ONT 24A may convert the electrical signal to an optical signal at 1310 nm and transmit the upstream optical signal to CO equipment 12. CO equipment 12 may then determine whether operational status (e.g., laser health) is satisfactory. In this manner, ONT 24A provides a reverse transport channel so that CO equipment 12 may remotely monitor operational status of micronode 22A.

Similarly, to determine other status information, such as received optical power, transmitted optical power, received electrical power, power supply status, or ingress noise levels, processing circuitry within micronode 22A may determine the pertinent status and convey a status reply to ONT 24A, which then transmits an upstream optical signal conveying the status reply to CO equipment 12. CO equipment may generate specific status request commands that request status of particular status items, or general status request commands that request status of all status items or a basic set of status items. Hence, micronode 22A may determine multiple status items or individual status items in response to a status request command, and convey an appropriate status reply to CO equipment 12 via ONT 24A. Status request commands may be transmitted, for example, periodically, according to a schedule, or at operator request.

In some examples, a micronode control channel 26 may be used to provide power to a respective micronode 22 in addition to management commands. For example, each ONT 24 may be coupled to a UPS unit that provides power to the ONT. A UPS may convert standard alternating current (AC) line power (e.g., 60 Hz, 120 V) from the subscriber premises to a direct current (DC) voltage to provide operating power the ONT 24. ONT 24 then may transmit operating power to micronode 22 via micronode control channel 26 or via a separate power connection. As alternatives, micronode 22 may be powered by a separate switchable power supply such as a separate UPS unit, and not require power from ONT 24, micronode 22 may be powered by a UPS unit and provide operating power to ONT 24 via micronode control channel 26 or via a separate power connection, or micronode 22 and ONT 24 may be coupled to their own, independent UPS units. As a further alternative, the UPS unit or units may be separate devices external to micronode 22 or ONT 24, or be provided within or integrated with housing associated with micronode 22 or ONT 24.

In the various UPS scenarios above, micronode 22 or ONT 24 may be configured to respond to status request commands for power supply status by monitoring appropriate status signals from the UPS unit. For example, micronode 22 or ONT 24 may be coupled to receive status signals from a UPS unit. If micronode 22 monitors UPS unit status signals, e.g., from a UPS unit coupled directly to micronode 22 or indirectly via ONT 24, then ONT 24 may receive such signals from micronode 22 as status messages via micronode control channel 26, and convert the status messages to upstream optical signals for transmission to CO equipment. Alternatively, if ONT 24 provides power to micronode 22, in some examples, ONT 24 may be configured to generate a power supply status reply itself, i.e., upon monitoring appropriate UPS unit status signals and conveying the status reply to CO equipment 12. As an example, a UPS unit may generate various status signals at output terminals that may be accessible to micronode 22 or ONT 24. Alternatively, the UPS unit may transmit status signals to micronode 22 or ONT 24, e.g., via a USB or I$^2$C interface. The status signal may include AC Fail, Battery Low, Replace Battery, or Battery Missing, as well as other status signals, each of which may be monitored by micronode 22 or ONT 24 to formulate a power supply status reply for CO equipment 12.

In some examples, each ONT 24 or micronode 22 may receive the status signal from a respective UPS unit. In examples where a micronode 22 receives the status signal, the micronode may output the status signal to the respective ONT 24 via micronode control channel 26. Each ONT 24 may convert the electrical signal to an optical signal at 1310 nm, and transmit the upstream 1310 nm optical signal that indicates the power supply status to CO equipment 12. In response, CO equipment 12 may determine whether further steps need to taken. For example, CO equipment 12 may determine whether the battery needs to replaced or recharged. As a further example, as an alternative or addition to generating a status reply in response to a status request command from CO equipment 12, micronode 22 or ONT 24 may be configured to voluntarily generate a status reply when a significant status event occurs, such as AC Fail or Battery Low in the case of power supply status, or any other status event, such as status events relating to noise ingress levels, optical power levels, electrical power levels, or the like.

As described above, micronode control channels 26 may be capable of communicating management commands and status messages between micronode 22 and ONT 24, as well as providing power to micronodes 22 in some implementations. Examples of micronode control channels 26 include a universal serial bus (USB) interface, an I²C plus power interface, or a custom interface. In some examples, micronode control channels 26 may not be capable of providing the power required by micronodes 22. For example, standard USB may only be capable of providing 2.5 W to a load which may not be enough to power one of micronodes 22. There are proposed USB standards that can deliver more power and are in early phases of standards development. In such instances where micronode control channels 26 cannot provide sufficient power, micronodes 22 may be coupled directly to respective UPS units and receive power directly from the UPS units. Alternatively, micronodes 22 may receive power from an additional power line coupled to ONTs 24.

Additionally, micronode control channels 26 may not be limited to USB cable or I²C plus power lines. For example, micronode control channels 26 may comprise a microstrip in examples where each micronode 22 resides in or one the same device housing or chassis as an ONT 24. As another example, micronode control channels 26 may comprise a cable for transmitting data in accordance with RS232, a copper cable such as a coaxial cable, or an optical fiber link in examples where micronodes 22 receive power directly from a respective UPS unit or from a separate power line, and where micronodes 22 and ONTs 24 are separate devices located within a common housing or a separate housing. As yet another example, in some implementations, micronode control channels 26 may comprise wireless communication channels to communicate maintenance commands and status messages between micronodes 22 and ONTs 24 via wireless communication techniques, such as IEEE 802.11x WLAN, Bluetooth, or the like. In accordance with this disclosure, any suitable technique to transmit and receive data may be utilized to communicate maintenance commands and status messages between micronodes 22 and respective ONTs 24.

Subscribers 30 receive the downstream voice, video, and data from CO equipment 12 and transmit upstream voice, video and data signals to CO equipment 12 via RF channels 28. As shown in more detail with respect to FIG. 3B, in some examples, each subscriber 30 comprises an electrical RF splitter/combiner that separates the downstream video information from the downstream voice and data information. The downstream video information may be provided to one or more set-top boxes coupled to one or more televisions. In some examples, televisions may be coupled directly to the RF splitter/combiner to receive video information. In such examples, set-top boxes may not be necessary. The downstream voice and data information may be provided to a cable modem that provides the voice information to one or more telephones and the data information to one or more computing devices. The cable modem and set-top box are examples of customer premises equipment (CPE) for a subscriber, i.e., a customer, and refer to equipment located in the subscriber premises to support application devices such as computers, telephones or televisions. Upstream voice, video and data signals may be provided to the electrical RF splitter/combiner to combine the RF voice, video and data signals for transmission to micronode 22. As described above, the micronodes 22 convert the RF voice, video and data signals to an upstream optical signal for upstream transmission to CO equipment 12.

FIG. 2 is a block diagram illustrating an example of CO equipment 12 for use in RFOG system 10. As shown in FIG. 2, CO equipment 12 may comprise an RF video headend 34, CMTS 36, conditional access system (CAS) 38, electrical RF splitter/combiner 40, laser transmitter 42, optical receiver 44, WDM 46, optical line terminal (OLT) 48, and management controller 50. Video headend 34 in conjunction with CAS 38 provide video information to subscribers 30. CAS 38 provides the video from video headend 34 to limited subscribers 30. CAS 38 encrypts the video information provided by video headend 34. As described above, subscribers 30 may include a set-top box for reception of video information. The set-top box may include a conditional access module that decrypts the video information encrypted by CAS 38. In some examples, CO equipment 12 may not encrypt the video information to provide video to subscribers that do not have a set-top box.

CMTS 36 is used to provide high speed data or voice services to subscribers 30. Subscribers 30 each may have CPE including a cable modem that receives voice and data. CMTS 36 enables communication with the cable modems at subscribers 30.

WDM 46 may be a coarse WDM (CWDM). WDM 46 combines and transmits the downstream 1550 nm voice, video, and data optical signals and the downstream 1490 nm management commands optical signals via fiber optic link 14. As shown in FIG. 2, WDM 46 receives voice, video, and data optical signals from laser transmitter 42. WDM 46 receives the maintenance commands from OLT 48. WDM 46 also receives and splits upstream 1610 optical voice, video and data signals and upstream 1310 nm management commands. As shown in FIG. 2, WDM 46 receives the voice, video and data optical signals and the management messages via fiber optic link 14. WDM 46 splits the upstream 1610 voice, video and data optical signals from the upstream 1310 nm maintenance commands and signals. WDM 46 provides the upstream 1610 nm optical signal to optical receiver 44 and provides the upstream 1310 nm optical signal to OLT 48.

Video headend 34, CMTS 36, and CAS 38 are coupled to RF electrical splitter/combiner 40. For downstream transmission, video headend 34, CMTS 36, and CAS 38 provide downstream electrical signals to splitter/combiner 40. Splitter/combiner 40 combines the downstream electrical signals and provides them to laser transmitter 42. Laser transmitter 42 converts the downstream electrical signals to downstream 1550 nm optical signals and transmits the downstream 1550 nm optical signals via WDM 46.

For upstream reception, optical receiver 44 receives the upstream 1610 nm optical signals. Optical receiver 44 converts the upstream 1610 nm optical signals to upstream electrical signals and provides the upstream electrical signals to splitter/combiner 40. Splitter/combiner 40 splits the electrical signals and provides them to CMTS 36 and CAS 38, video command signals to CAS 38 and voice and data signals to CMTS 36.

Management controller 50 transmits and receives maintenance commands and signals. Management controller 50 may include one or more programmable processors, microprocessors or digital signal processors (DSPs), one or more application specific integrated circuits (ASICs), one or more field programmable gate arrays (FPGAs), one or more application specific special processors (ASSPs) and/or other equivalent integrated or discrete logic circuitry. In some examples, management controller 50 may be a stand alone computer or a card residing in a housing, rack or chassis containing other CO equipment 12.

Management controller 50 may transmit management commands to a micronode 22 via OLT 48 and a respective ONT 24 communicatively coupled to micronode 22. For example, management controller 50 may transmit configuration commands or status request commands to ONTs 24 via OLT 48. Configuration commands may include software or firmware updates, which may be referred to generally as code updates, or service enable/disable commands. Status request commands may include individual or general status requests for any of a variety of operational status items. As described above, in response to commands from management controller 50, ONT 24 provides the command to micronode 22.

Management controller 50 also may receive status messages from micronodes 22 via respective ONTs 24 and OLT 48. For example, upon a request from management controller 50 or voluntarily, micronodes 22 may transmit to management controller 50 a variety of status information for the micronode such as ingress noise levels, received optical power, transmitted optical power, received electrical power, laser health, and power supply status. Management controller 50 may then determine whether the status indications are adequate or whether action is required. For example, if the laser health of micronode 22A indicates that the laser is about to fail, management controller 50 may generate a message indicating that the laser in micronode 22A needs to be replaced.

Management controller 50 transmits and receives maintenance commands and status messages via OLT 48. For downstream transmission, management controller 50 transmits maintenance commands to OLT 48. OLT 48 converts the electrical management commands to optical signals, e.g., to 1490 nm optical signals. OLT 48 transmits the downstream 1490 nm optical signals to micronodes 22 via WDM 44, fiber optic link 14, fiber link 18 and ONTs 24. For upstream reception, OLT 48 may receive the status messages from ONT 24, e.g., as 1310 nm optical signals, via WDM 46. OLT 48 converts the 1310 nm optical signals to electrical signals and provides the electrical signals to management controller 50. As described above, management controller 50 may determine if further action is necessary based on the received status messages. Again, the status messages may be voluntary status messages or status replies generated in response to status request commands.

OLT 48 may be configured to transmit and receive optical signals according to any suitable optical networking protocol, such as a PON protocol. As examples, OLT 48 may be configured to transmit and receive optical signals according to the GPON standard, BPON standard, EPON standard or Active Ethernet (AE) standard. For example, OLT 48 may transmit data based on data representation, signaling, timing, error detection, authentication, and other requirements specified by a particular PON protocol, e.g., GPON. Likewise, ONT 24 may be configured in a similar manner to operate according to the optical networking protocol. In some cases, other optical networking protocols may be used, such as other PON protocols.

FIG. 3A is a block diagram illustrating an example micronode 22A for use in RFOG system 10. As shown in FIG. 3A, micronode 22A may include photodiode 52, downstream receiver 54, diplexer 56, RF splitter 58, burst mode detector 60, upstream receiver 62, laser driver 64, laser 66, WDM 68, micronode management interface 70, processing circuitry 72, memory 74, status interface 75 and power supply 77.

As described above, WDM 20A receives all downstream and upstream optical signals. WDM 20A separates the 1550 nm downstream optical signals, 1490 nm downstream optical signals, 1610 nm upstream optical signals, and 1310 nm upstream optical signals. In some cases, the 1610 nm upstream optical signals may be 1590 nm optical signals. The 1550 nm downstream and 1610 nm upstream optical signals may be considered micronode signals, while the 1490 nm downstream and 1310 upstream signals may be considered ONT signals. For downstream optical signal reception, WDM 68 separates the 1550 nm downstream optical signal and the 1610 nm upstream optical signal and provides the 1550 nm voice, video, and data information to photodiode 52.

WDM 68 may be a CWDM. In some cases, as described in this disclosure, micronode 22A and ONT 24A may be provided in separate housings or together in a single housing. Also, in some cases, micronode 22A may include its own WDM 68 while ONT 24A may include a second WDM. Alternatively, a single WDM may shared between micronode 22A and ONT 24A to direct appropriate signals with appropriate wavelengths to the micronode and ONT. Hence, micronode 22A and ONT 24A may be packaged in a variety of ways, e.g., ONT and micronode in a single box, ONT and micronode in separate boxes, WDM combined with the micronode and serving both the micronode and the ONT, WDM combined with the ONT and serving both the micronode and the ONT, or WDM outside ONT and micronode.

Photodiode 52 converts the 1550 nm voice, video, and data information to an electrical current. Photodiode 52 provides the electrical current to downstream receiver 54. Downstream receiver 54 converts the electrical current to a downstream RF electrical voltage signal. Downstream receiver 54 outputs the RF signal to diplexer 56. Diplexer 56 provides the downstream voice, video, and data electrical signals to CPE of subscriber 30A via RF channel 28A. The combination of photodiode 52 and downstream receiver 54 may be referred to as a micronode optical receiver.

For upstream optical signal transmission, diplexer 56 receives upstream RF electrical signals from CPE associated with subscriber 30A via RF channel 28A. As described above, the time when subscriber 30A is allowed to transmit upstream data may be predetermined based on upstream grants assigned to subscriber 30A or micronode 22A according to TDMA techniques. Diplexer 56 provides the upstream RF electrical signal to RF splitter 58. RF splitter 58 provides the upstream RF electrical signal to burst mode detector 60 and upstream receiver 62 of micronode 22A.

Upstream receiver 62 provides the upstream electrical signals to laser driver 64, which drives laser 66 to convert the upstream RF electrical signal to an upstream 1610 nm optical signal. Simultaneously, burst mode detector 60 receives the upstream electrical signal from RF splitter 58. Upon sensing that upstream information is ready to be delivered, burst mode detector 60 enables laser driver 64 so that laser driver 64 can deliver the upstream information. Burst mode detector 60 disables laser driver 64 when there is no more upstream information to be delivered. Laser 66 provides the upstream 1610 nm optical signal to WDM 68. WDM 68 transmits the upstream 1610 nm to splitter/combiner 16 via WDM 20A and optical fiber 18. The combination of splitter 58, burst mode detector 60, upstream receiver 62, laser driver 64, and laser 66 may be referred to as a micronode optical transmitter.

In the example of FIG. 3A, micronode 22A also comprises micronode management interface 70, processing circuitry 72, memory 74, and status interface 75. In some cases, micronode 22A may include a power supply 77 coupled to a UPS unit 79. Power supply 77 may provide operating power to micronode 22A using power delivered by UPS unit 79. In other cases, micronode 22A may receive power from ONT 24A via micronode management interface 70. Alternatively, micronode 22A may receive power from ONT 24A via a separate power line coupled to micronode 22A and ONT 24A. Micronode management interface 70 provides an interface for communication with ONT 24A via micronode control channel 26A. For example, micronode interface 70 may receive maintenance commands from ONT 24A and transmits status messages to ONT 24A. Micronode management interface 70 may include an appropriate interface or bus controller to support communication between micronode 22A and ONT 24A. If micronode control channel 26A operates according to the USB protocol, for example, micronode management interface 70 may include a USB controller. In other examples, if micronode control channel 26A is wireless or optical, micronode management interface 70 may include an appropriate wireless or optical media controller.

Micronode management interface 70 may receive maintenance commands from ONT 24A and provide the maintenance commands to processing circuitry 72. Conversely, micronode interface 70 may receive status messages from processing circuitry 72 and provide the maintenance commands to ONT 24A. Processing circuitry 72 may comprise one or more programmable processors, such as a microprocessor, DSP, ASIC, FPGA, ASSP and/or other equivalent integrated or discrete logic circuitry. In some examples, the operations of processing circuitry 72 may be performed by multiple processors within micronode 22A. Processing circuitry 72 may execute instructions, e.g., software, stored in memory 74. Memory 74 may be a computer-readable storage medium that stores instructions that cause processing circuitry 72 to perform certain operations. Examples of memory 74 include a computer data storage medium such as random access memory (RAM), synchronous dynamic random access memory (SDRAM), non-volatile random access memory (NVRAM), electrically erasable programmable read-only memory (EEPROM), FLASH memory, magnetic or optical data storage media, and the like.

Processing circuitry 72 may perform various operations. Although shown as separate devices, in some examples, processing circuitry 72 may provide some or all of the functionality of the video receiver 54, burst mode detector 60, and upstream receiver 62. For example, processing circuitry 72 may place upstream receiver 62 into sleep mode when micronode 22 is not bursting upstream data. In response to a configuration command, processing circuitry 72 may enable or disable delivery of services or load memory 74 with a code update. Also, in response to a status request command, processing circuitry 72 may determine any of a variety of different status items, e.g., via a status interface 75.

Status interface 75 may provide access to different signals or sensors within micronode 22. The signals or sensors may monitor laser status (e.g., laser bias current level), power supply status, received optical power level (e.g., from optical fiber link 18), transmitted optical power level (e.g., to optical fiber link 18), received electrical power level (e.g., from RF channel 28A), ingress noise level (e.g., from RF channel 28A or elsewhere), and the like. Processing circuitry 72 may query status interface 75 in response to a status request command received from ONT 24A via micronode management interface 70 and micronode control channel 26, and generate a status reply for communication to ONT 24 via micronode management interface 70 and micronode control channel 26.

Processing circuitry 72 may determine the power supply status of UPS 79 via power supply 77 in examples where UPS unit 79 is coupled to micronode 22A. In examples where micronode 22A receives power from ONT 24A, e.g., via micronode control interface 26A or another connection, processing circuitry 72 may determine the status of UPS unit 79 by requesting the status from ONT 24A. For example, if ONT 24A is coupled to UPS unit 79, processing circuitry 72 may send a signal to ONT 24A via micronode management interface 70 and micronode control channel 26 requesting that ONT 24A determine the status of UPS 79, and either transmit the status to micronode 22A so that processing circuitry 72 may generate a status reply, or directly transmit a status reply from ONT 24A to CO equipment 12.

In response to an enable/disable command, processing circuitry 72 controls downstream receiver 54 to enable or disable service to subscriber 30A. In some examples, CO equipment 12 may only desire to enable or disable video service. In such examples, processing circuitry 72 controls downstream receiver 54 to only enable or disable signal to downstream receiver 54, which may cause downstream receiver 54 to filter out (disable) or not filter out (enable) video signals from the RF signals transmitted to subscriber 30A via RF channel 28A.

Micronode 22A also may receive code updates from CO equipment 12 via micronode management interface 70, micronode control channel 26A and ONT 24A. If a code update is necessary, one or more management commands sent to micronode 22A via ONT 24A may include or be accompanied by code update data that is loaded into memory 74 by processing circuitry 72. Processing circuitry 72 then may execute the code update data stored in memory 74 to accomplish a code update to fix or update the operation of micronode 22A, or add new functionality or services. In some cases, micronode 22A may generate a confirmation message to confirm that the code update was completed, and provide the confirmation message to ONT 24A for upstream transmission to CO equipment 12.

In some examples, instead of providing status messages only upon receipt of status request commands from CO equipment 12, processing circuitry 72 may voluntarily monitor and transmit status information to CO equipment 12, e.g., at periodic or schedule intervals. Additionally, or alternatively, processing circuitry 72 may continuously or periodically monitor various status items, and voluntarily send status messages to CO equipment 12 via ONT 24A when a significant status event is detected, such as a status indicating possible battery failure, laser failure or other operational problems in the micronode 22A. In some examples, UPS unit 79 may transmit significant status event signals to micronode 22A or ONT 24A, e.g., in the form of an alarm signal.

In some examples where micronode 22A and ONT 24A transmit upstream optical signals in the same time slot, processing circuitry 72 may provide the status information to ONT 24A during granted transmission times based on TDMA techniques. In this case, ONT 24A may transmit the status information of micronode 22A to CO equipment 12 during the same slot as upstream signals transmitted by micronode 22A. Because subscriber 30A is granted a certain time slot in which to transmit all upstream data, micronode 22A and ONT 24A may need to transmit all upstream data, e.g., an upstream 1610 nm optical signal and an upstream 1310 nm optical signal during the granted time slot.

In other examples where micronode 22A and ONT 24A transmit upstream optical signals in the same time slot, processing circuitry 72 may provide the status information to ONT 24A when status information is generated. ONT 24A may store the status information from micronode 22A. During the time slot when micronode 22A and ONT 24A transmit upstream optical signals, micronode 22A and ONT 24A may transmit the upstream optical signals in the same time slot, e.g., an upstream 1610 nm optical signal and an upstream 1310 nm optical signal during the granted time slot.

In examples where micronode 22A and ONT 24A do not need to transmit upstream optical signals in the same time slot, micronode 22A may provide the status information to ONT 24A when the status information is generated. ONT 24A may store the status information from micronode 22A. During the time slot assigned to subscriber 30A, micronode 22A transmits the 1610 nm upstream optical signals, e.g., the voice, video and data information. During a different time slot assigned to ONT 24A, ONT 24A may transmit the 1310 nm upstream optical signals, e.g., status reply signals.

Upon reception of the status messages from ONT 24A, CO equipment 12 may determine whether any action, such as a service order, is necessary. For example, if the status information indicates that laser 66 is close to failure, e.g., laser 66 has a high bias current, CO equipment 12 may determine whether a truck roll is necessary to replace laser 66. Using remote monitoring, however, the carrier may order truck rolls only when necessary, thereby reducing costs. For example, with remote monitoring, the carrier does not need to order a truck roll only to ensure that laser 66 is operating correctly, thereby avoiding the time and expense of a truck roll.

FIG. 3B is a block diagram illustrating an example ONT 24A including a micronode management interface for managing micronode 22A. As shown in FIG. 3B, ONT 24A may include a photodiode 76, downstream receiver 78, RF diplexer 80, RF splitter 82, burst mode detector 84, upstream receiver 86, laser driver 88, laser 90, WDM 92, micronode management interface 94, ONT processing circuitry 96, memory 98, and power supply 100. WDM 20A receives all downstream and upstream optical signals. WDM 20A separates the 1550 nm downstream optical signals, 1490 nm downstream optical signals, 1610 nm upstream optical signals, and 1310 nm upstream optical signals. For downstream optical signal reception, WDM 92 separates the 1490 nm downstream optical signal and the 1310 nm upstream optical signal and provides the 1490 nm management commands to photodiode 76. WDM 92 may be a CWDM.

Photodiode 76 converts the 1490 nm maintenance commands and signals to an electrical current signal. Photodiode 76 provides the electrical current signal to downstream receiver 78. Downstream receiver 78 converts the electrical current to a downstream electrical voltage signal. Downstream receiver 78 outputs the electrical voltage signal to diplexer 80. The combination of photodiode 76 and downstream receiver 78 may be referred to as an ONT optical receiver. Diplexer 80 outputs the electrical voltage signal to ONT processing circuitry 96.

ONT processing circuitry 96 may include optical networking MAC layer processing functionality to process information received according to the optical networking protocol. For example, ONT processing circuitry 96 may include PON MAC layer processing circuitry, such as GPON MAC layer processing circuitry, to support communication according to the optical networking protocol. Processing circuitry 96 processes the downstream signals and converts them to management commands for micronode 22A. Processing circuitry 96 may execute instructions, e.g., software, stored in memory 98.

Memory 98 may be a computer-readable storage medium that stores instructions that cause processing circuitry 96 to perform certain operations. Examples of memory 98 include a computer data storage medium such as random access memory (RAM), synchronous dynamic random access memory (SDRAM), non-volatile random access memory (NVRAM), electrically erasable programmable read-only memory (EEPROM), FLASH memory, magnetic or optical data storage media, and the like.

Processing circuitry 96 transmits the management commands, which may include configuration commands or status request commands, to micronode 22A via micronode management interface 94 and micronode control channel 26A. Like micronode management interface 70 of FIG. 3A, micronode management interface 94 may include an interface or bus controller configured to support communication across micronode control channel 26A using a selected protocol, e.g., USB, $I^2C$, or RS232. Again, in various implementations, micronode management interface 94 may support wireless, optical or wired communication. Micronode control channel 26A, if wired, may support transmission of power from ONT 24A to micronode 22A in some examples. FIG. 3B shows power supply 100 receiving power from an external UPS unit 79. However, UPS unit 79 may be provided within the housing of ONT 24A in some implementations.

For upstream optical signal transmission, processing circuitry 94 receives upstream electrical signal from micronode 22A via micronode management interface 94 and micronode control channel 26A. The upstream electrical signals received from micronode 22A may include, for example, status replies, voluntary status messages or confirmation messages. Processing circuitry 94 converts the upstream electrical signals from micronode 22A into upstream electrical signals configured for communication according to an optical networking protocol, and more particularly a PON protocol such as GPON. Diplexer 80 receives the PON protocol signals and provides them to electrical splitter 82. Splitter 82 provides the upstream electrical signal to burst mode detector 84 and upstream receiver 86.

Upstream receiver 86 provides the upstream electrical signals to laser driver 88, which that drives laser 90 to convert the upstream electrical signal to an upstream 1310 nm optical signal. Simultaneously, burst mode detector 84 receives the upstream electrical signal from splitter 82. Upon sensing that upstream information is ready to be delivered, burst mode detector 84 enables laser driver 88 so that laser driver 88 can deliver the upstream information. Burst mode detector 84 disables laser driver 88 when there is no more upstream information to be delivered.

Laser 90 provides the upstream 1310 nm optical signal to WDM 92. WDM 92 transmits the upstream 1310 nm to splitter/combiner 16 via WDM 20A and optical fiber link 18A. The combination of splitter 82, burst mode detector 84, upstream receiver 86, laser driver 88, and laser 90 may be referred to as an ONT optical transmitter. CO equipment 12 and, more particularly, OLT 48 and management controller 50 receive the upstream signals, which provide a reverse transport channel for status information from micronode 22A.

In examples where micronode 22A and ONT 24A transmit upstream optical signals in the same time slot, ONT 24A may receive the maintenance commands and signals from micronode 22A within the time slot and transmit the maintenance commands and signals within the same time slot. Alternatively, ONT 24A may receive the maintenance commands and signals from micronode 22A as they are generated and store them in memory 98. During the granted time slot for subscriber 30A, micronode 22A may transmit voice and data information from subscriber 30A and ONT 24A may transmit the maintenance commands and signals stored in memory 98.

In examples where micronode 22A and ONT 24 do not transmit upstream optical signals in the same time slot, ONT 24A may receive the maintenance commands and signals and store them in memory 98. During the granted time slot for subscriber 30A, micronode 22A may transmit voice and data information from subscriber 30A. During the granted time slot for ONT 24A, ONT 24A may transmit the maintenance commands and signals stored in memory 98 via optical fiber link 18A according to the selected PON protocol.

FIG. 3B also shows a dotted line connection 101A from an output of processing circuitry 96 to subscriber 30A. Connection 101A, in dotted line, indicates a future upgrade path at a time when the operator elects to upgrade CO equipment 12 and CPE to be PON-compliant. At that time, it may be possible to connect ONT 24A directly to CPE associated with subscriber 30A to provide PON services. In some cases, micronode 22A then may be eliminated, in which case all services are provided by ONT 24A. Alternatively, at an intermediate upgrade stage, ONT 24 may be used to deliver voice and data services to subscriber 30A, while micronode 22A is retained at least temporarily to provide video services.

Figure 3C:
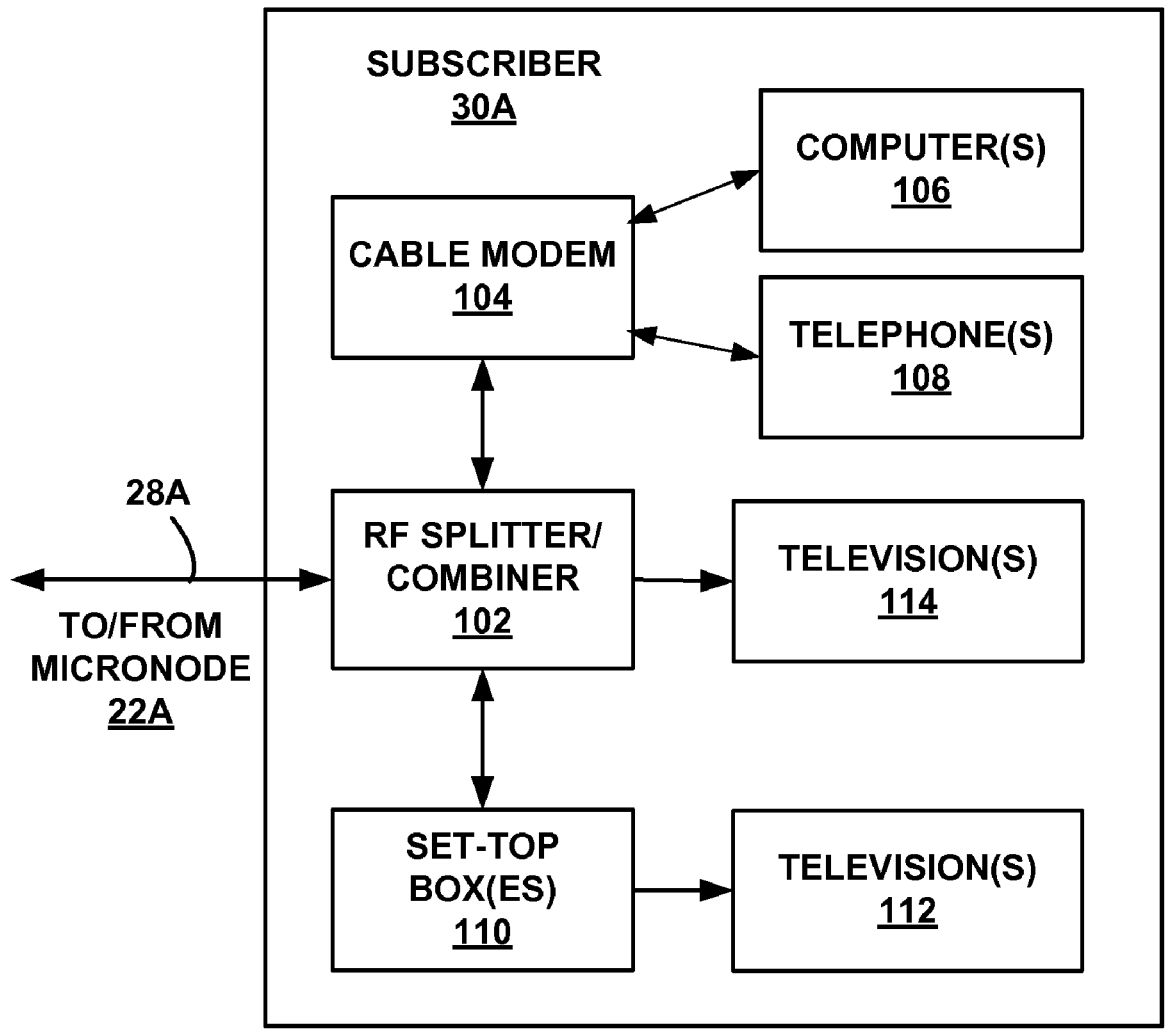
FIG. 3C is a block diagram illustrating an example of CPE coupled to a micronode in an RFOG system.

FIG. 3C is a block diagram illustrating an example of CPE associated with a subscriber 30A and coupled to micronode 22A in RFOG system 10. As shown in FIG. 3C, the CPE associated with subscriber 30A may include RF splitter/combiner 102, cable modem 104, one or more computers 106, one or more telephones 108, one or more set-top boxes 110, and one or more televisions 112 and 114. RF splitter/combiner 102 receives downstream RF signals for voice, video and data services from micronode 22A, and splits the signals between cable modem 104 and set-top boxes 110. In particular, RF splitter 102 sends downstream voice and data signals to cable modem 104 to support data services via computers 106 and voice services via telephones 108. In addition, RF splitter 102 sends downstream video signals to set-top boxes 110 to support presentation of video services via televisions 112.

RF splitter/combiner 102 also combines upstream signals from cable modem 104 and set-top boxes 110 for transmission to micronode via RF channel 28A. The upstream signals from cable modem 104 may be upstream voice signals from telephones 108 and upstream data signals from computers 106 for communication to CMTS 36. The upstream signals from set-top boxes 110 may include video service signals, such as video service requests for communication to CAS 38. Micronode 22A serves as a media converter to convert the upstream RF signals received from subscriber 30A into optical signals and convert the downstream optical signals received from CO equipment 12 into RF signals for communication to subscriber 30A.

As shown in FIG. 3C, televisions 112 receive video information from set-top boxes 110. Set-top boxes 110 may allow televisions 112 to display video-on-demand and similar services that require subscriber 30A to transmit upstream video requests. However, some televisions do not necessarily need to be connected to set-top boxes 110. In some examples, as shown in FIG. 3C, televisions 114 may be coupled directly to RF splitter/combiner 102 to receive video. In some examples, television 114 may include components that function substantially in a manner similar to set-top box 110, e.g., components that are capable of transmitting upstream requests. In other examples, televisions 114 may operate as passive devices to simply receive video.

Figure 4:
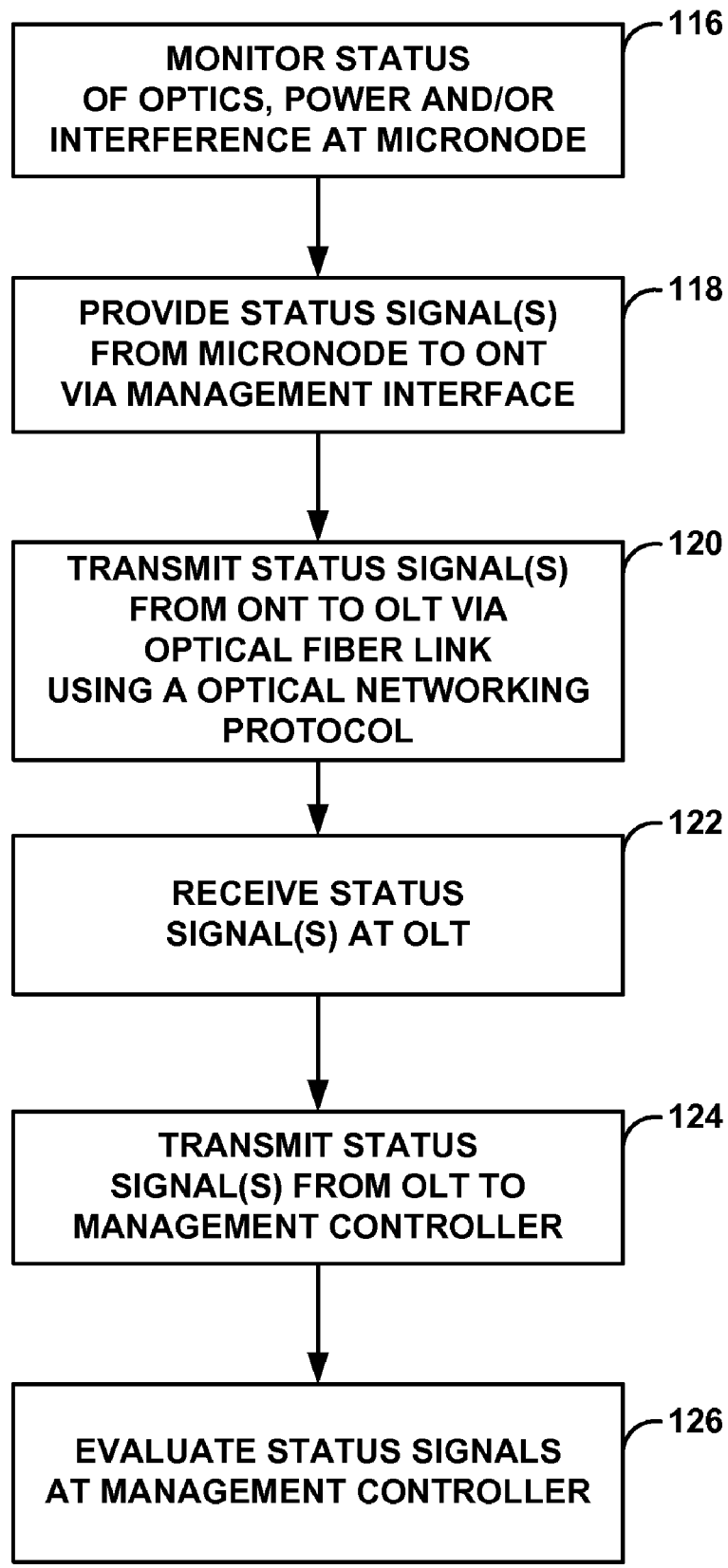
FIG. 4 is a flowchart illustrating an example method for determining status of a micronode via an ONT coupled to a micronode management interface.

FIG. 4 is a flowchart illustrating an example method for determining status of a micronode 22A via an ONT 24A. For purposes of illustration, the method will be described with reference to various components shown in FIGS. 2, 3A and 3B. As shown in FIG. 4, in response to a status request command, a status event, or a periodic or scheduled status check, processing circuitry 72 of micronode 22A may monitor one or more status items (116), such as optics, power or interference status.

For example, processing circuitry 72 may monitor power supply status, received optical power level, transmitted optical power level, received electrical power level, or ingress noise level at micronode 22A. In examples where CO equipment 12 requests laser health, received optical power, received electrical power, and/or ingress noise level, CO equipment 12 transmits the request as a status request command to ONT 24A, which provides the status request to processing circuitry 72 via micronode management interfaces 70, 94 and micronode control channel 26A. Alternatively, processing circuitry 72 may voluntarily monitor status and transmit status information to ONT 24A.

Processing circuitry 72 provides the status signals from micronode 22A to ONT 24A as a status reply or status message via micronode management interfaces 70, 94 and micronode control channel 26A (118). ONT 24A then transmits the status reply or status message to OLT 48 via optical fiber link 18A using an optical networking protocol (120), e.g., such as the GPON protocol, other PON protocols, or an AE protocol. OLT 48 receives the status signal or signals, e.g., as a status reply or status message, from ONT 24A (122), and transmits the status signals from the OLT to management controller 50 (124).

Management controller 50 may evaluate the status signals (126) and generate any messages that may be appropriate based on the status signals. For example, management controller 50 may simply generate output for review by operator personnel, e.g., on a display, printout, audible message, status light, or the like, so that operator personnel may take appropriate action. Alternatively, management controller 50 may automatically generate a message to order appropriate action, such as a truck roll to replace or repair a component of micronode 22A.

In some cases, the operation of management controller 50 in generating configuration commands or status request commands may be directed by operator personnel. As an alternative, the operation of management controller 50 in generating configuration commands or status request commands may be partially or entirely automated such that substantially no intervention by operator personnel is needed to continuously or periodically monitor, configure and otherwise manage micronode 22A.

As an illustration, if the micronode 22A senses a laser end-of-life alarm, the micronode may send the laser end-of-life message to ONT 24A. ONT 24A then sends the laser end-of-life message to OLT 48, which provides the message to management controller 50. Management controller 50 may send the alarm message to system maintenance software, which initiates a micronode maintenance operation, such as triggering a truck roll, sending a code update to adjust laser drive signals, or other actions.

Figure 5:
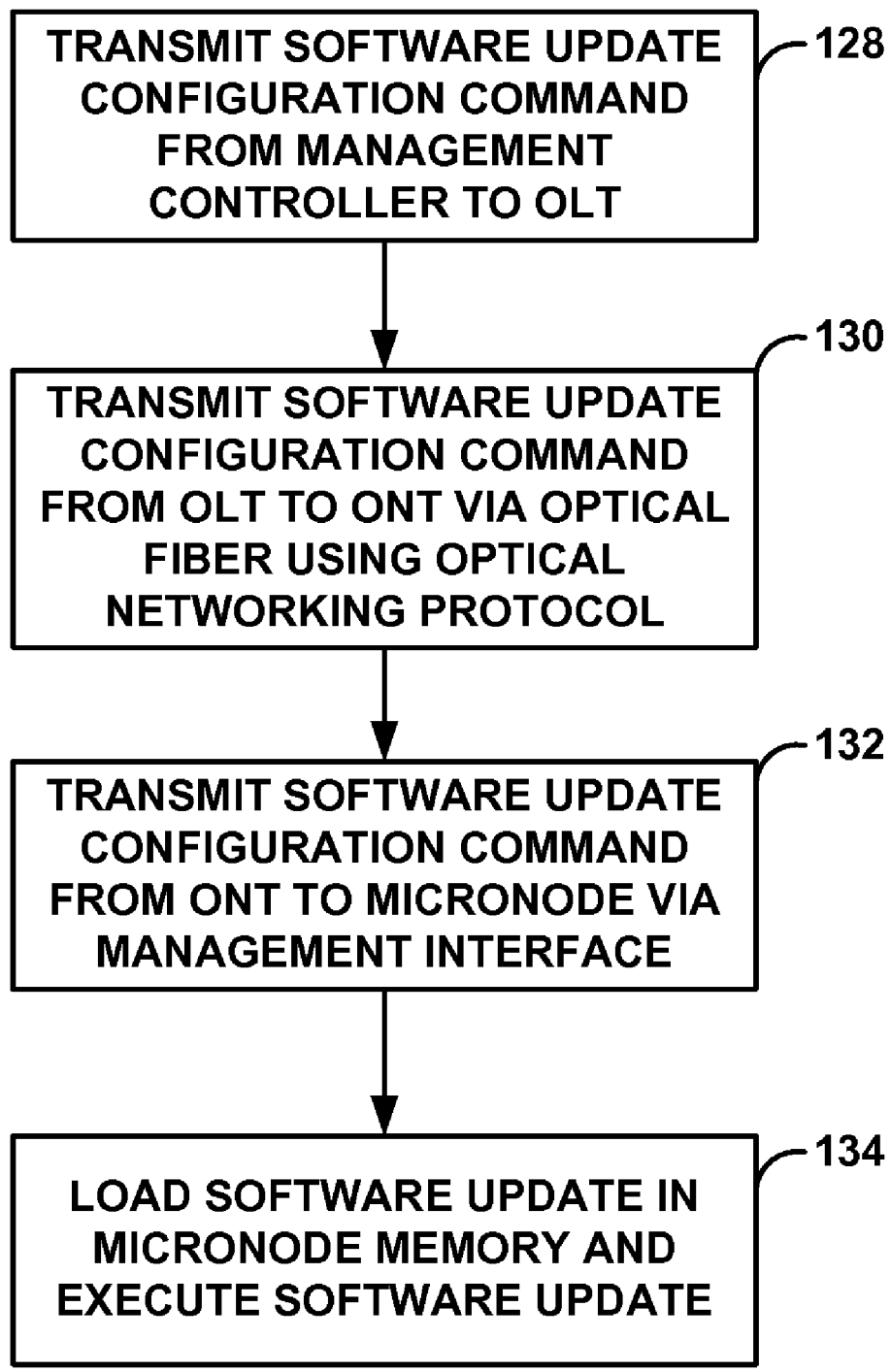
FIG. 5 is a flowchart illustrating an example method for configuring a micronode with a code update via an ONT coupled to a micronode management interface.

FIG. 5 is a flowchart illustrating an example method for configuring a micronode with a code update configuration command via an ONT coupled to a micronode management interface. For purposes of illustration, the method will be described with reference to various components shown in FIGS. 2, 3A and 3B. In some cases, an operator may desire to update software or firmware executed by processing circuitry 72 in micronode 22A. Management controller 50 may transmit the code update confirmation command to OLT 48 to instruct micronode 22A to load the code update (128), illustrated as software update in FIG. 5 for purposes of example. The configuration command may include or be accompanied by code update data.

OLT 48 may transmit the code update configuration command to ONT 24A via optical fiber link 18A using an optical networking protocol, such as the GPON protocol, other PON protocols, or an AE protocol (130). ONT 24A receives the code update configuration command and transmits the code update configuration command to micronode 22A to update code executed by processing circuitry 72 within micronode 22A via micronode management interfaces 70, 94 and micronode control channel 26A (132). In response to the configuration command, processing circuitry 72 loads a code update into memory 74 of micronode 22A and executes the code update (134).

In some cases, processing circuitry 72 may generate a confirmation message to indicate to management controller 50 that the code update has been completed. The confirmation message may be transmitted from ONT 24A to OLT 48 using an optical networking protocol, such as a PON protocol or more specifically a GPON protocol, or an AE protocol. The code update may be a regular, scheduled update to update or add to the capabilities of micronode 22A. Alternatively, the code update may be provided to fix a problem in micronode 22A, either as detected for micronodes in general or as detected for the individual micronode 22A as a result of remote status monitoring.

As an illustration, if system maintenance software executed by management controller 50 has a code update for micronode 22A, the management controller may send the code update, including code update commands and code, as applicable, to OLT 48. OLT sends the code update to ONT 24A, which sends the code update to micronode 22A. Upon receiving the code update, micronode 22A updates its memory with the code update.

Figure 6:
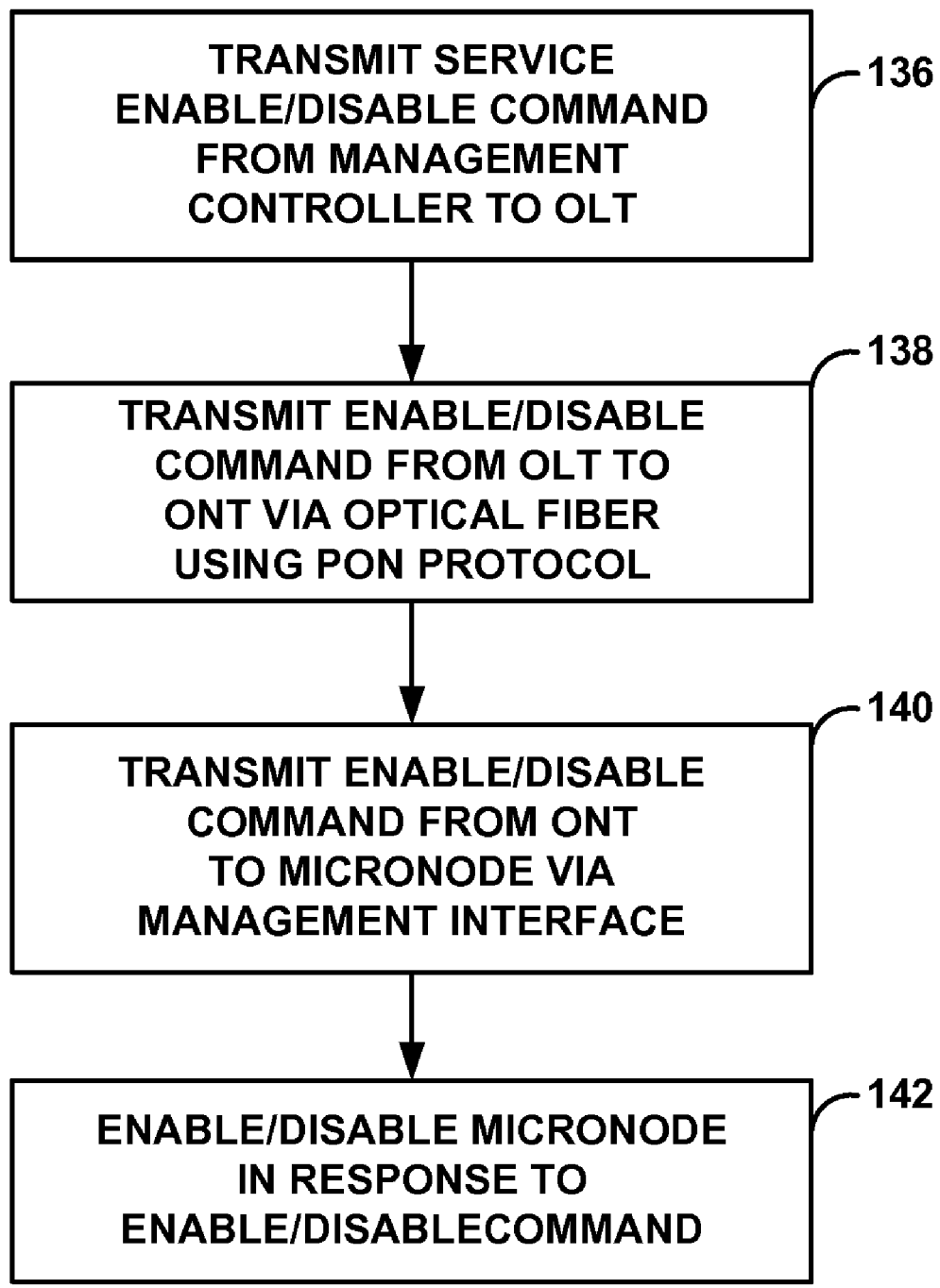
FIG. 6 is a flowchart illustrating an example method for configuring services provided by a micronode via an ONT coupled to a micronode management interface.

FIG. 6 is a flowchart illustrating an example method for configuring services provided by a micronode via an ONT coupled to a micronode management interface. For purposes of illustration, the method will be described with reference to various components shown in FIGS. 2, 3A and 3B. A carrier may desire to enable or disable service to subscriber 30A, either entirely or for a selected service. To that end, management controller 50 may provide an enable/disable service configuration command to OLT 48 (136). The enable/disable service configuration command indicates either that service should be enabled or that service should be disabled.

OLT 48 transmits the enable/disable configuration command to ONT 24A via optical fiber link 18A using an optical networking protocol, such as the GPON protocol, other PON protocols, or an AE protocol (138). ONT 24A converts the optical enable/disable command to an electrical signal and transmits the signal to micronode 22A via micronode management interfaces 70, 94 and micronode control channel 26A (140). Micronode 22A then enables or disables one or more services in response to the enable/disable command (142). In some cases, processing circuitry 72 may generate a confirmation message to indicate to management controller 50 that the service enablement or disablement has been completed.

The techniques described herein may be implemented in hardware, software, firmware, or any combination thereof Various features described as modules, units or components may be implemented together in an integrated logic device or separately as discrete but interoperable logic devices or other hardware devices, including optical hardware components. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software, the techniques may be realized at least in part by a computer-readable medium comprising instructions that, when executed, cause a processor to perform one or more of the methods described above. For example, the computer-readable medium may store such instructions.

A computer-readable medium may form part of a computer program product, which may include packaging materials. A computer-readable medium may comprise a computer data storage medium such as RAM, SDRAM, ROM, NVRAM, EEPROM, FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by processing circuitry including one or more processors, such as one or more DSPs, general purpose microprocessors, ASICs, FPGAs, ASSPs, or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various aspects have been described in this disclosure. These and other aspects are within the scope of the following claims.

The invention claimed is:

1. A system comprising:
a radio frequency over glass (RFOG) micronode that converts a first downstream optical signal having a first wavelength to a downstream radio frequency (RF) electrical signal, and converts an upstream RF electrical signal to a first upstream optical signal having a second wavelength;
an optical network terminal (ONT) that receives a second downstream optical signal having a third wavelength, from a device other than the micronode, transmits at least one of a configuration command and a status request command to the micronode based on the second downstream optical signal, and transmits a second upstream optical signal having a fourth wavelength; and
a wave division multiplexer (WDM) that combines the first and second upstream optical signals from the micronode and the ONT, and splits the first and second downstream optical signals between the micronode and the ONT.

2. The system of claim 1, wherein the ONT receives the second downstream optical signal according to an optical networking protocol.

3. The system of claim 2, wherein the optical networking protocol is a passive optical network (PON) protocol.

4. The system of claim 2, wherein the optical networking protocol is a Gigabit Passive Optical Network (GPON) protocol.

5. The system of claim 1, wherein the command includes the status request command, and the status request command includes a request for at least one of laser status, power supply status, interference status, received optical power status and received electrical power status from the micronode.

6. The system of claim 1, wherein the command includes the status request command, and the micronode transmits a status message to the ONT in response to the status request command, and wherein the ONT transmits the second upstream optical signal in response to the status message.

7. The system of claim 1, wherein the command includes the configuration command, the configuration command comprises a software update for the micronode, and the micronode executes the software update in response to the configuration command.

8. The system 1, wherein the command includes the configuration command, the configuration command includes a service enable/disable command to enable or disable delivery of a service by the micronode, and the micronode enables or disables delivery of the service in response to the configuration command.

9. The system of claim 1, wherein the first downstream optical signal includes a signal to support at least one of voice, video and data services for a subscriber device.

10. The system of claim 1, further comprising an optical line terminal (OLT) that transmits the second downstream signal to the ONT and receives the second upstream signal from the ONT.

11. The system of claim 10, further comprising a controller, coupled to the OLT, that controls the OLT to transmit the command in the second downstream optical signal.

12. A micronode for use in a radio frequency over glass (RFOG) system, the micronode comprising:
- an optical receiver that converts a first downstream optical signal to a downstream radio frequency (RF) electrical signal, wherein the first downstream optical signal includes a signal to support at least one of voice, video and data services for a subscriber device;
- an optical transmitter that converts an upstream RF electrical signal to an upstream optical signal; and
- an interface that receives at least one of a configuration command and a status command from an optical network terminal (ONT) that receives a second downstream optical signal from a device other than the micronode, wherein the status command includes a request for at least one of laser status, power supply status, interference status, received optical power status, and received electrical power status,
- wherein, when the interface receives the status command, the interface transmits a status message to the ONT in response to the status command,
- wherein the configuration command includes at least one of a software update for the micronode and a service enable/disable command to enable or disable delivery of a service by the micronode,
- wherein, when the configuration command includes the software update, the micronode executes the software update in response to the software update, and
- wherein, when the configuration command includes the service enable/disable command, the micronode enables or disables delivery of the service in response to the service enable/disable command.

13. The micronode of claim 12, wherein the interface receives the second downstream optical signal according to an optical networking protocol.

14. The micronode of claim 13, wherein the optical networking protocol is a passive optical network (PON) protocol.

15. The micronode of claim 13, wherein the optical networking protocol is a Gigabit Passive Optical Network (GPON) protocol.

16. A method comprising:
- in a radio frequency over glass (RFOG) micronode, converting a first downstream optical signal having a first wavelength to a downstream radio frequency (RF) electrical signal, and converting an upstream RF electrical signal to a first upstream optical signal having a second wavelength;
- in an optical network terminal (ONT), receiving a second downstream optical signal having a third wavelength, from a device other than the micronode, transmitting at least one of a configuration command and a status request command to the micronode based on the second downstream optical signal, and transmitting a second upstream optical signal having a fourth wavelength; and
- in a wave division multiplexer (WDM), combining the first and second upstream optical signals from the micronode and the ONT, and splitting the first and second downstream optical signals between the micronode and the ONT.

17. The method of claim 16, wherein the ONT receives the second downstream optical signal according to an optical networking protocol.

18. The method of claim 17, wherein the optical networking protocol is a passive optical network (PON) protocol.

19. The method of claim 17, wherein the optical networking protocol is a Gigabit Passive Optical Network (GPON) protocol.

20. The method of claim 16, wherein the command includes the status request command, and the status request command includes a request for at least one of laser status, power supply status, interference status, received optical power status and received electrical power status from the micronode.

21. The method of claim 16, wherein the command includes the status request command, the method further comprising transmitting a status message from the micronode to the ONT in response to the status request command, wherein transmitting the second upstream optical signal comprises transmitting the second upstream optical signal from the ONT in response to the status message.

22. The method of claim 16, wherein the command includes the configuration command, and the configuration command comprises a software update for the micronode, the method further comprising executing the software update in the micronode in response to the configuration command.

23. The method of 16, wherein the command includes the configuration command, and the configuration command includes a service enable/disable command to enable or disable delivery of a service by the micronode, the method further comprising enabling or disabling delivery of the service from the micronode in response to the configuration command.

24. The method of claim 16, wherein the first downstream optical signal includes a signal to support at least one of voice, video and data services for a subscriber device.

25. The method of claim 16, further comprising transmitting the second downstream signal from an optical line terminal (OLT) to the ONT and receiving the second upstream signal from the ONT at the OLT.

26. The method of claim 25, further comprising, in a controller coupled to OLT, controlling the OLT to transmit the command in the second downstream optical signal.

* * * * *